(No Model.)

D. O. EVEREST.
HARROW TOOTH HOLDER.

No. 400,398. Patented Mar. 26, 1889.

Witnesses:
Walter S. Wood
S. N. Burke

Inventor.
David O. Everest
By Lucius C. West
Atty.

United States Patent Office.

DAVID O. EVEREST, OF PINE GROVE, ASSIGNOR OF ONE-HALF TO THE WILLIAMS MANUFACTURING COMPANY, OF KALAMAZOO, MICHIGAN.

HARROW-TOOTH HOLDER.

SPECIFICATION forming part of Letters Patent No. 400,398, dated March 26, 1889.

Application filed February 11, 1889. Serial No. 299,465. (No model.)

*To all whom it may concern:*

Be it known that I, DAVID O. EVEREST, a citizen of the United States, residing at Pine Grove, county of Van Buren, State of Michigan, have invented a new and useful Harrow-Tooth Holder, of which the following is a specification.

This invention relates to that class of harrows in which the tooth is tilted to change its depth of cut; and it more especially relates to holders for adjustably attaching the straight shank of a curved or bowed harrow-tooth to the frame.

The object of the invention consists in making a recess in the beam on an incline—that is, deeper at one end than at the other—for the shank of the tooth, and certain means for changing the position of said shank in tilting the tooth to cause it to cut shallow or deep, substantially as below set forth.

Figure 1:
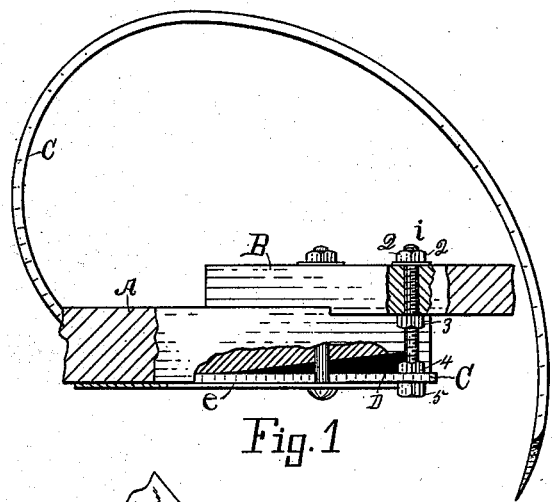
Figure 2:
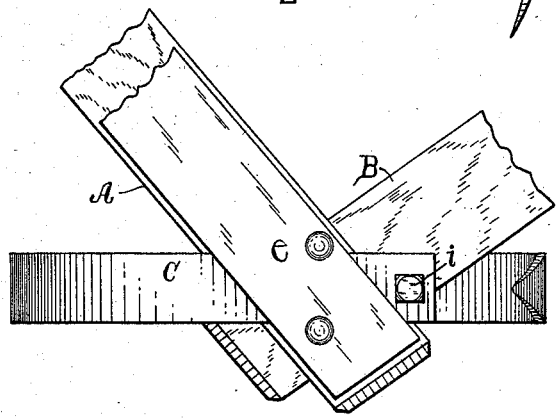
Figure 3:
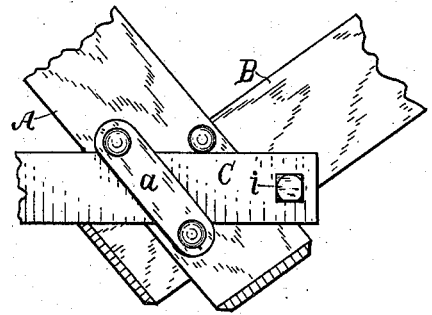

Referring to the drawings forming a part of this specification, Figure 1 is a side elevation with portions of the harrow-beams broken away; Fig. 2 an under plan of Fig. 1; and Fig. 3 is the same, showing a change.

Referring to the letters marked on the drawings, A B are the ordinary crossed beams of a harrow-frame.

At D is a recess cut into the beam A and across the same at the angle shown by the shank of the tooth C in Fig. 2; but so far as this invention is concerned it does not matter whether the beams cross each other, as here shown, or whether the recess for the shank of the tooth is straight or obliquely across the beam. The recess at the front side or end is of a depth corresponding to the thickness of the shank of the tooth, or nearly so, in order that the binding-plate $e$ will clamp the tooth to the beam at this side only of the recess. This plate may be a metal strip facing the under side of the beam the entire length, (see $e$, Figs. 1 and 2,) or it may be a short clip-plate, $a$, as in Fig. 3. The recess inclines from the front side toward the rear—that is, it grows deeper toward the rear side, as in Fig. 1.

At $i$ is an adjusting-bolt passed through the frame and attached at the lower end to the rear end of the shank of the tooth. This bolt and the clamping of the plate at the forward side of the recess firmly holds the tooth. By raising or lowering the bolt $i$ the shank of the tooth is raised or lowered the desired distance at the rear end. This action rocks the shank of the tooth over the front edge of the recess, where the plate clamps said shank and tilts the working end of the tooth up or down according to the desired depth of cut. The bolt $i$ has a head, 5, and a nut, 4, at the lower end, between which the end of the shank of the tooth is clamped, the bolt of course being passed through the shank of the tooth. The head 5 may be a nut, if preferred. The bolt is held attached to the beam in an adjustable manner by nuts 2 3 Fig. 1. By lowering or raising these nuts 2 3, the bolt is raised or lowered and carries the shank of the tooth up or down. This is a very desirable way to attach and adjust the bolt $i$; but any other suitable plan may be adopted.

Having thus described my invention, what I claim, and desire to secure by Letters Patent of the United States, is—

The combination of a harrow-beam having the inclined recess, a tooth or share, a binding-plate clamping the tooth to the beam at one side of the recess, and an adjusting-bolt attached to the frame and to the shank of the tooth, substantially as set forth.

In testimony of the foregoing I have hereunto subscribed my name in presence of two witnesses.

DAVID O. EVEREST.

Witnesses:
 DAVID D. WISE,
 ORDELIA A. WISE.